(12) United States Patent
Conradie

(10) Patent No.: US 8,376,373 B2
(45) Date of Patent: Feb. 19, 2013

(54) CONTROLLABLE SUSPENSION ARCHITECTURE FOR ENHANCED ARMOURED VEHICLE SURVIVABILITY

(75) Inventor: Daniel Francois Conradie, London (CA)

(73) Assignee: General Dynamics Land Systems, Ontario (CA)

( * ) Notice: Subject to any disclaimer, the term of this patent is extended or adjusted under 35 U.S.C. 154(b) by 159 days.

(21) Appl. No.: 12/951,562

(22) Filed: Nov. 22, 2010

(65) Prior Publication Data

US 2011/0127733 A1 Jun. 2, 2011

Related U.S. Application Data

(60) Provisional application No. 61/263,683, filed on Nov. 23, 2009.

(51) Int. Cl.
*B60G 17/052* (2006.01)
(52) U.S. Cl. .................................. 280/5.514; 280/5.515
(58) Field of Classification Search ............... 280/5.514, 280/5.5, 5.507, 5.515
See application file for complete search history.

(56) References Cited

U.S. PATENT DOCUMENTS

| | | | |
|---|---|---|---|
| 3,254,738 A | 6/1966 | Larsen | |
| 3,299,978 A | 1/1967 | Sponsler | |
| 3,459,439 A | 8/1969 | Sinclair et al. | |
| 3,689,103 A | 9/1972 | Meulendyk | |
| 3,871,682 A | 3/1975 | Kirschner et al. | |
| 3,970,327 A | 7/1976 | Dezelan | |
| 4,063,611 A | 12/1977 | Anderson | |
| 4,230,341 A | 10/1980 | Hart et al. | |
| 4,447,073 A | 5/1984 | Brandstadter | |
| 4,454,925 A | 6/1984 | Oswald et al. | |
| 4,468,050 A | 8/1984 | Woods et al. | |
| 4,492,282 A | 1/1985 | Appelblatt et al. | |
| 4,651,838 A | 3/1987 | Hamilton et al. | |
| 4,652,008 A | 3/1987 | Davis | |
| 4,702,843 A | 10/1987 | Oswald et al. | |
| 4,744,589 A | 5/1988 | Buma et al. | |
| 4,919,440 A | 4/1990 | Tsukamoto | |
| 4,960,290 A | 10/1990 | Bose | |
| 4,969,662 A | 11/1990 | Stuart | |
| 5,024,460 A * | 6/1991 | Hanson et al. | 280/5.519 |
| 5,097,916 A | 3/1992 | Brandstadter | |
| 5,475,596 A | 12/1995 | Henry et al. | |
| 5,570,287 A | 10/1996 | Campbell et al. | |
| 5,639,110 A | 6/1997 | Pierce et al. | |
| 5,899,288 A * | 5/1999 | Schubert et al. | 180/89.12 |
| 5,947,458 A | 9/1999 | Rhodes et al. | |
| 6,036,201 A | 3/2000 | Pond et al. | |
| 6,070,681 A * | 6/2000 | Catanzarite et al. | 180/89.15 |

(Continued)

FOREIGN PATENT DOCUMENTS

| CA | 2053916 A1 | 10/1990 |
|---|---|---|
| CA | 2054206 A1 | 11/1990 |

(Continued)

OTHER PUBLICATIONS 6,243,631, Jun. 5, 2001, Ohsaku (withdrawn).

*Primary Examiner* — Drew Brown
(74) *Attorney, Agent, or Firm* — Hunton & Williams LLP

(57) ABSTRACT

The present embodiments relate to a semi-active suspension control system that utilizes controllable dampers for the purpose of improving maneuverability and vehicle hull stabilization. The disclosed semi-active control system can work in conjunction with a height management unit and on vehicles having variable ride heights, and hull stability and maneuverability can be achieved regardless of vehicle payload and ride height.

21 Claims, 5 Drawing Sheets

U.S. PATENT DOCUMENTS

| | | | |
|---|---|---|---|
| 6,266,590 B1 | 7/2001 | Kutscher et al. | |
| 6,311,110 B1 * | 10/2001 | Ivers et al. | 701/37 |
| 6,389,341 B1 | 5/2002 | Davis | |
| 6,428,026 B1 | 8/2002 | Smith | |
| 6,732,033 B2 * | 5/2004 | LaPlante et al. | 701/37 |
| 6,904,344 B2 * | 6/2005 | LaPlante et al. | 701/37 |
| 7,273,117 B2 * | 9/2007 | Pond | 180/24.02 |
| 7,340,334 B2 * | 3/2008 | Izawa et al. | 701/37 |
| 7,665,585 B2 * | 2/2010 | Alexandridis | 188/280 |
| 7,885,740 B2 * | 2/2011 | Izawa et al. | 701/37 |
| 7,950,674 B2 * | 5/2011 | Honig et al. | 280/5.514 |
| 7,959,163 B2 * | 6/2011 | Beno et al. | 280/5.5 |
| 2002/0149161 A1 | 10/2002 | Smith | |
| 2003/0160369 A1 | 8/2003 | LaPlante et al. | |
| 2003/0184056 A1 | 10/2003 | Bowers | |
| 2003/0225494 A1 | 12/2003 | Coelingh et al. | |
| 2003/0225495 A1 | 12/2003 | Coelingh et al. | |
| 2005/0085970 A1 | 4/2005 | Song et al. | |
| 2005/0242532 A1 | 11/2005 | Deo et al. | |
| 2006/0060750 A1 | 3/2006 | Alexandridis | |
| 2006/0192361 A1 | 8/2006 | Anderson et al. | |
| 2008/0018073 A1 | 1/2008 | Pond | |
| 2008/0189010 A1 | 8/2008 | Cubalchini | |
| 2008/0284118 A1 | 11/2008 | Venton-Walters et al. | |
| 2009/0062983 A1 | 3/2009 | Knoll et al. | |
| 2010/0138116 A1 | 6/2010 | Coombs | |

FOREIGN PATENT DOCUMENTS

| | | |
|---|---|---|
| EP | 1188588 A1 | 3/2002 |
| GB | 2154187 A | 9/1985 |
| WO | 2008048199 A2 | 4/2008 |

* cited by examiner

CONTROLLABLE SUSPENSION ARCHITECTURE FOR ENHANCED ARMOURED VEHICLE SURVIVABILITY

CROSS REFERENCE TO RELATED APPLICATION

The present application claims the benefit of U.S. provisional application 61/263,683, filed Nov. 23, 2009, which is incorporated herein by reference in its entirety.

FIELD OF INVENTION

The present embodiments of the invention relate, generally, to vehicle suspension systems and, more particularly, to a semi-active suspension control system that increases the mobility and survivability performance of armoured vehicles.

BACKGROUND

Armoured vehicles are designed to perform various operations while encountering specific threat conditions. In performing these operations, both the payload of the vehicle and the threat conditions that the vehicle encounters can vary dramatically. The payload and threat conditions often correspond to each other since various protection systems are installed on the vehicle depending on the particular theatre of operation. Vehicles are often loaded to the maximum allowed weight rating when the threat is large and have very little payload when there is no threat, such as during a training exercise. For safety considerations, it is important to not exceed the weight rating of the vehicle since critical subsystems could be affected, such as the brake system, the suspension system, the driveshaft, or the wheels.

The vehicle-rated payload may be defined as the difference between the gross weight and the empty weight. Payload is carried by the vehicle chassis as sprung mass and supported by the vehicle suspension system. Unsprung mass may be defined as the weight that is not carried by the suspension system, such as the suspension system itself, the axles and the wheels.

The purpose of a suspension system is to absorb dynamic forces of the sprung mass while the vehicle is in motion to ensure reliable and safe ride performance. This is particularly important for armoured vehicles in severe cross-country terrain and during cornering and transient steering maneuvers on hard surfaces. There are generally three types of suspension systems: passive, semi-active, and active. Passive systems are simple and cost-effective because they are based on fixed spring and damping rates that are optimized for one particular payload, but are incapable of optimization for variable payloads. Active systems can control both the spring and damping rates, but are expensive, require complex, high-power actuators at each wheel, and add a large amount of mass to the vehicle. The semi-active system disclosed herein, on the other hand, retains the advantages of an active system by allowing for controllable dampers and optimization for variable payloads and ride heights, but without the attendant cost, complexity, power requirements, or large increase in mass.

Suspension systems are typically designed for a particular weight grade and vehicle design. However, deployed armoured vehicles often have a widely varying payload and center of gravity. Further, it has proven difficult for a single suspension system to be utilized in different variants of the same vehicle design. As explained below, it is often beneficial to change the ride height of a vehicle, particularly armoured vehicles, to improve the mobility performance and survivability. A suspension system design for armoured vehicles should be tailored to support a family of vehicles with low- and high-sprung mass and variable ride heights to enable safe and reliable mobile performance under varying road conditions.

Several mathematical models exist to rate the mobility performance of military vehicles for different theatres of operation. One key performance criteria is defined as % No-Go, which characterizes the probability that a specific vehicle at a given weight would be unable to traverse the terrain when deployed to a specific theatre. The % No-Go always increases in relation with an increase in vehicle weight. However, by increasing vehicle ride height, it is generally possible to decrease the % No-Go (i.e., improve one aspect of the mobility performance) of a heavily loaded vehicle. Accordingly, it would be advantageous to provide a controllable suspension system for armoured vehicles that is capable of supporting high ride conditions and a resultant high center of gravity for a heavily loaded vehicle that is to deploy to an operational theatre having severe terrain.

Another important rating for military vehicles is survivability. When subjected to an explosive force (e.g. an improvised explosive device (IED)), the survivability of a vehicle and its occupants is related to the vehicle ride height during the time of explosion. When the ride height is higher, the sprung mass (including the hull and occupants) is farther removed from the source of explosive force. It is generally recognized that the explosive force on the hull of a vehicle is reduced by approximately 5% for each 10 mm increase in the distance between the vehicle hull and the source of the explosive force.

Accordingly, when there is a threat of explosive devices aimed at the vehicle hull and its occupants, or to improve % No-Go when traversing severe terrain, it is desirable to increase the ride height by pumping additional gas in the gas springs. However, by increasing the amount of gas locked into a gas spring chamber, the force-deflection relationship of the spring is changed. The most important result is that the amount of available extension stroke is reduced and the available compression stroke is increased. The effect on the gas spring is that the longer compression stroke as well as the increase in gas mass leads to much higher pressures when the spring is compressed to its maximum stroke. The spring design needs to accommodate the higher pressure as well as a modified end stop design because of the shortened extension stroke due to an increased ride height.

While % No-Go and survivability can be improved by increasing ride height, a low ride height is beneficial for other aspects of mobility performance such as vehicle handling and maneuvering. Increasing the ride height increases the vehicle's center of gravity and the susceptibility of a rollover event. To prevent rollovers, armoured vehicles are generally designed to understeer when cornering at excessive speeds. The speed at which steering is limited is termed the critical understeering speed. Similarly, the critical tipping speed is the speed at which the vehicle would start tipping during cornering at a particular radius, and is indirectly proportional to the vehicle's vertical center of gravity or ride height. It is considered safe design practice to ensure that the critical understeering speed is considerably lower than the critical tipping speed. The suspension and steering design should be harmonized to ensure that the vehicle understeers in a constant radius curve long before the critical tipping speed occurs. Variables that affect understeering include axle spacing and lateral tire characteristics, and understeering is directly related to the fact that multi-axle vehicles have scrubbing (non-steerable) axles. There is a need in the prior art to control understeering for vehicles having a variable ride height. There is also a need to keep the vehicle flat during cornering so that the steering response and lateral traction do not substantially change when the vehicle goes from riding high to riding low, or vice versa.

Another purpose of a vehicle suspension system is to maximize traction between the tires and the road surface. During transient steering maneuvers, braking, or accelerating the vehicle rolls (left/right) and/or pitches (front/back). The rolling and pitching motions of the sprung mass result in patterns of weight transfer between the tires, which can lead to a momentary decrease or loss of traction at one or more tires, which in turn can result in unsafe handling performance. A vehicle with increased ride height is generally subject to greater rolling and pitching motions. Accordingly, there is a need in the prior art for a suspension system capable of controlling the rolling and pitching motions of a vehicle with a variable ride height, and therefore a variable center of gravity, to thereby ensure optimal mobility performance.

Some armoured vehicles are equipped with a height management system that adjusts the ride height of the vehicle by varying the column height of gas contained in each suspension spring under nominal conditions. Nominal conditions may be defined as the height relationship between the sprung and unsprung masses when the vehicle is at rest. The current state of the art is to control the vehicle ride height to a predetermined nominal level regardless of the distribution of wheel loads, vehicle payload, mission profile, vehicle speed, or transient driving conditions. Accordingly, there is a need in the art for a controllable suspension system capable of working in conjunction with a height management system to actively control the damping response at variable ride heights (spring extension strokes) while the vehicle is in motion and under varying conditions. The objective is to ensure that vehicle ride and handling are indistinguishable for various ride heights by utilizing a generic damper algorithm that reacts appropriately to counteract the effects of increased rolling and pitching motions the vehicle experiences when driven at higher ride heights.

SUMMARY OF THE EMBODIMENTS

An aspect of the present invention provides a semi-active suspension control system for stabilizing a vehicle comprising a spring element positioned between a portion of a hull and a drive shaft of the vehicle; a controllable damper element positioned adjacent to the spring element; a wheel sensor positioned at a wheel station on the vehicle for measuring displacement of a wheel of the vehicle; a hull sensor positioned on the hull of the vehicle for sensing displacement of the hull; and a suspension controller for delivering a variable output signal to the controllable damper element, the variable output signal being based on displacement data acquired by the wheel and hull sensors, and effectuating a damping response of the controllable damper.

Another aspect of the present invention provides a semi-active suspension control system for stabilizing a multi-axle vehicle comprising a plurality of wheels; a spring element positioned near each wheel of the multi-axle vehicle; a controllable damper element positioned adjacent to each spring element; a plurality of wheel sensors for sensing displacement of the wheels, each wheel of the multi-axle vehicle having at least one of the plurality of wheel sensors positioned adjacent thereto; at least one hull sensor positioned on a hull of the vehicle for sensing displacement of the hull; and a suspension controller and at least one hardware interface box for delivering a unique variable output signal to each controllable damper element, the unique variable output signals being based on displacement data acquired by the plurality of wheel sensors and the at least one hull sensor, each of the variable output signals effectuating a damping response of one of the controllable damper elements.

BRIEF DESCRIPTION OF THE DRAWINGS

While the specification concludes with one or more claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which the like reference numerals designate like parts throughout the figures.

DESCRIPTION

For simplicity and illustrative purposes, the principles of the present invention are described by referring mainly to exemplary embodiments. However, one of ordinary skill in the art would readily recognize that the same principles are equally applicable to, and can be implemented in, many types of systems involving vehicle suspension systems or other similar devices, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims.

Figure 1:
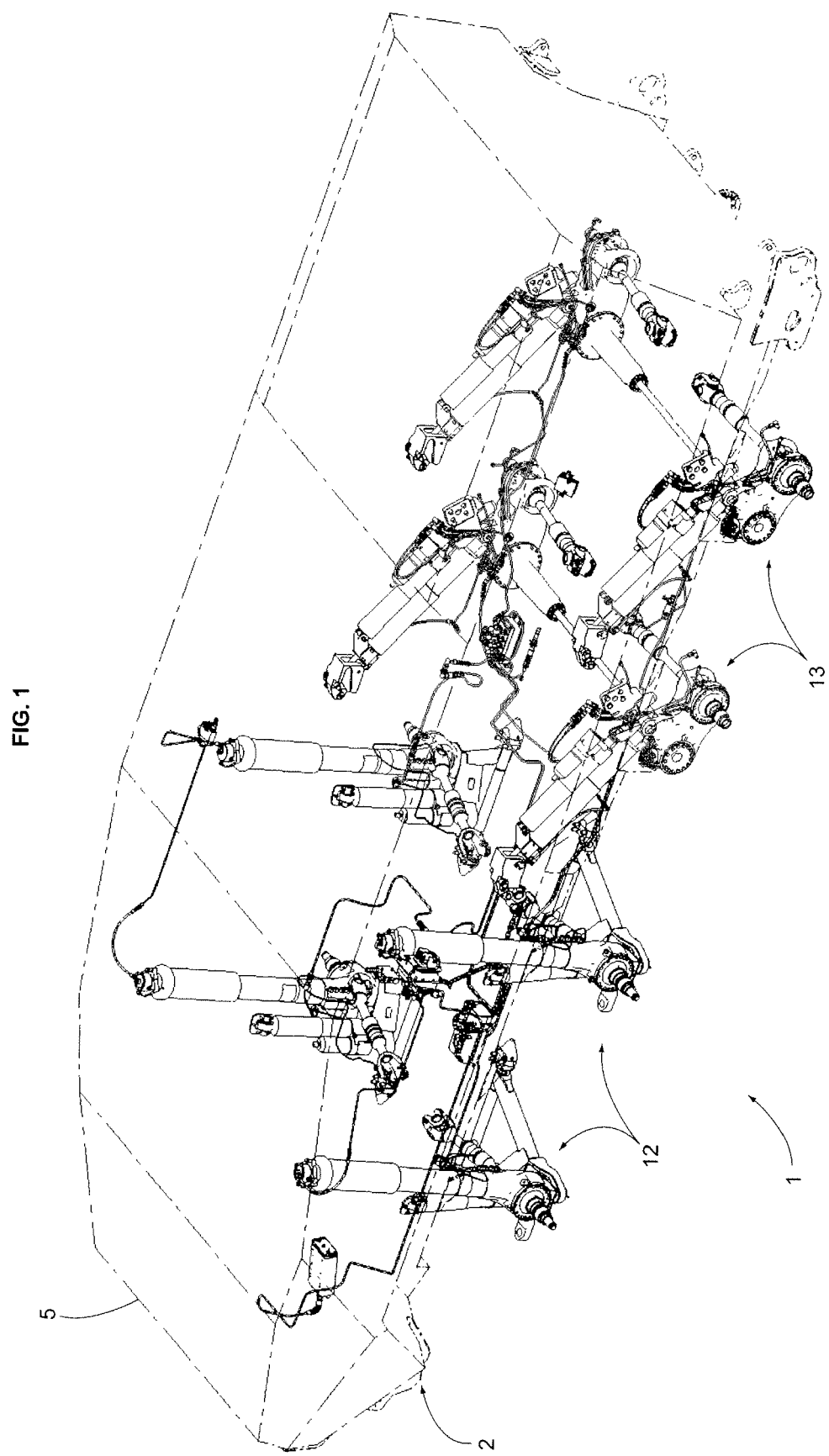
FIG. 1 is a schematic of the suspension control system according to one aspect of the invention.

FIG. 1 shows an exemplary embodiment of the semi-active suspension control system 1, which is aimed at improving mobility performance, ride quality, % No Go, and survivability while taking into account variable payloads, ride heights, vehicle motion, and various mission profiles. A mission profile may be characterized as a combination of, inter alia, the profile of the road (elevation and directional changes), terrain conditions (paved road or cross-country), environmental conditions (rain, ice, or snow) and vehicle speed. The semi-active suspension control system 1 actively controls damper response at each wheel 30 based on the relative motion of each wheel 30 and the absolute motion of the vehicle hull 5. The semi-active suspension control system 1 may also work in conjunction with a height management system comprising a height management unit 3 that controls the vehicle's ride height by varying the column height of gas contained in each suspension spring 10. In general, the semi-active suspension control system 1 controls the response of the controllable damper 20 while taking into account vehicle ride height, wheel displacement, hull displacement, the distribution of wheel loads, vehicle payload, mission profile, vehicle speed, and transient driving conditions.

The suspension control system 1 and height management unit 3 can advantageously level the vehicle 2 under variable driving conditions regardless of the longitudinal or lateral weight distribution of the vehicle 2 by sensing wheel 30 and hull 5 displacements and by varying the response of dampers 20 located at each wheel station 31. In this manner, weight transfer of the sprung mass is controlled, thereby minimizing the rolling and pitching motions which leads to improved handling and a higher critical tipping speed. Vehicle slides are more controllable and less likely to occur when the rolling and pitching motions are restricted by targeted control of damper 20 characteristics.

In one aspect of the invention, spring 10, which is typically a gas spring, is designed to work effectively with the height management unit 3 and the controllable damper 20. In particular, the spring 10 may be designed to have a larger-than-normal tube volume such that the spring rate is lower for higher ride heights. A larger tube volume allows the height management unit 3 to raise the ride height of the vehicle 2 without over-pressurization of the spring at full compression. Further, a lower spring rate allows the spring 10 to absorb higher frequency vibrations without transferring them to the vehicle hull 5. Lower spring rates are possible because the controllable dampers 20 are capable of delivering large damping forces when necessary. In this manner, the suspension control system 1 is able to work in conjunction with the height management unit 3 to actively control the damping response at variable ride heights while the vehicle 2 is in motion and under varying conditions. Vehicle response can be optimized for high speed handling by combining the characteristic suspension forces exerted by the springs 10 and stabilizer bars 60 with algorithms specifically aimed at applying targeted damping forces during cornering. The suspension control system 1 can reduce pitching during acceleration or braking thereby reducing longitudinal weight transfer and improving vehicle hull stability. Hull stability improves the comfort of passengers, improves visibility for the driver, and can also improve target acquisition and weapon system stabilization characteristics.

In general, natural dynamic motions experienced by each wheel are influenced by the profile of the road, terrain conditions, environmental conditions, tire inflation pressure, and vehicle velocity or acceleration. These natural dynamic motions of the wheels are controlled by actively adjusting in real-time the damper characteristics such that the ride and handling of the vehicle are improved. For example, when a vehicle accelerates the inertial forces of the vehicle generally cause the rear of the vehicle to lower and the front of the vehicle to rise, depending on the actual geometry of the front and rear suspension. By increasing the damping response at the appropriate wheel stations during acceleration the pitch of the vehicle can remain level. Similarly, when a vehicle turns the inertial forces of the vehicle cause the side of the vehicle at the inner radius of the turn to rise and the side of the vehicle at the outer radius to lower. Increasing the damping response at the appropriate wheel stations during the turn can prevent angular roll of the vehicle such that the hull remains level. Accordingly, by adjusting the damping response during cornering, acceleration or braking, the roll and pitch of the vehicle can be minimized so that the hull remains level.

In a related example, when a wheel 30 begins to pass over an obstacle the wheel 30 moves upward and the spring 10 compresses. The suspension control system 1 can respond by immediately lowering the damping response of the damper 20 until the wheel 30 has passed over the rock. In this way, the wheel 30 can glide over the rock without large forces being transmitted to the vehicle hull 5. As the wheel 30 and spring 10 rebound to their nominal levels the suspension control system 1 can increase the damping response to prevent further oscillation of the spring 10 so that vehicle "bounce" is prevented. In effect, each damper 20 is controlled by taking into account the relative motions of all of the wheels 30 for the purpose of keeping the vehicle hull 5 as level as possible. End-stop control may also be utilized such that if the spring 10 compresses or extends to a certain point the suspension control system 1 can raise the damping response to prevent over-compression or over-extension, respectively, of the spring 10.

The performance of the exemplary embodiments of the invention is independent of payload or vehicle ride height variations because the suspension control system 1 can self-optimize the vehicle handling and ride purely based on the motions of the wheels 30 and the vehicle hull 5. The suspension control system 1 also protects chassis components critical to vehicle reliability by effectuating a controllable damper response to reduce the peak load distributed to these components so that critical design thresholds are not exceeded for the intended duty cycle variable ride heights.

The controllable damping algorithms were derived from a physics-based model and can be applied to a wide variety of vehicles with varying number of wheels or payload. The disclosed vehicle suspension control system 1 incorporates the necessary suspension components, geometry, electrical harnesses, control methodology and software required to set-up vehicles of different configurations, including a variable number of wheels/axles, variable vehicle weight, vehicle center of gravity, suspension geometry and tire specification. The suspension control system may also be retrofit on existing armoured vehicles.

Figure 2:
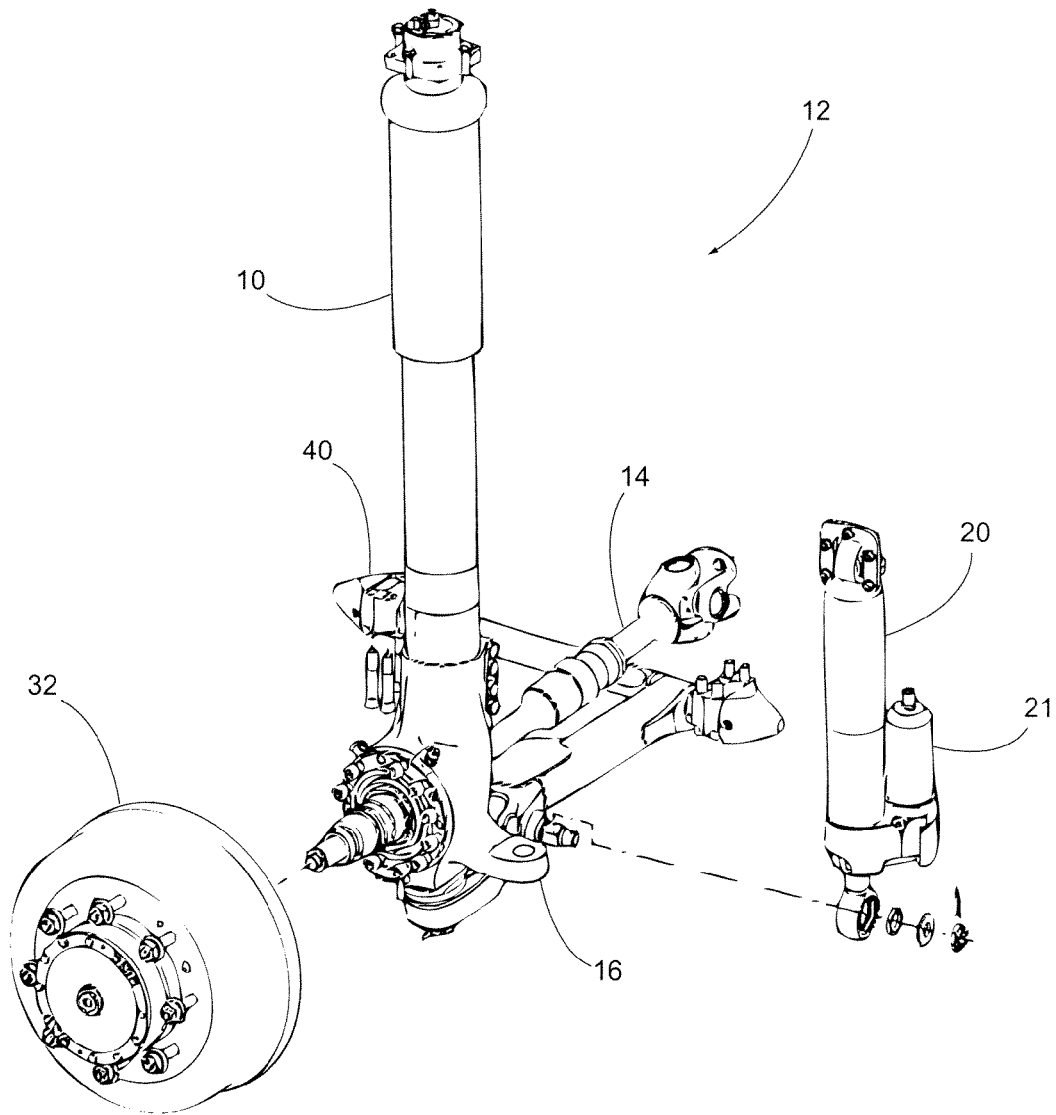
FIG. 2 is a perspective view of a portion of the suspension control system at a steering axle.
Figure 3:
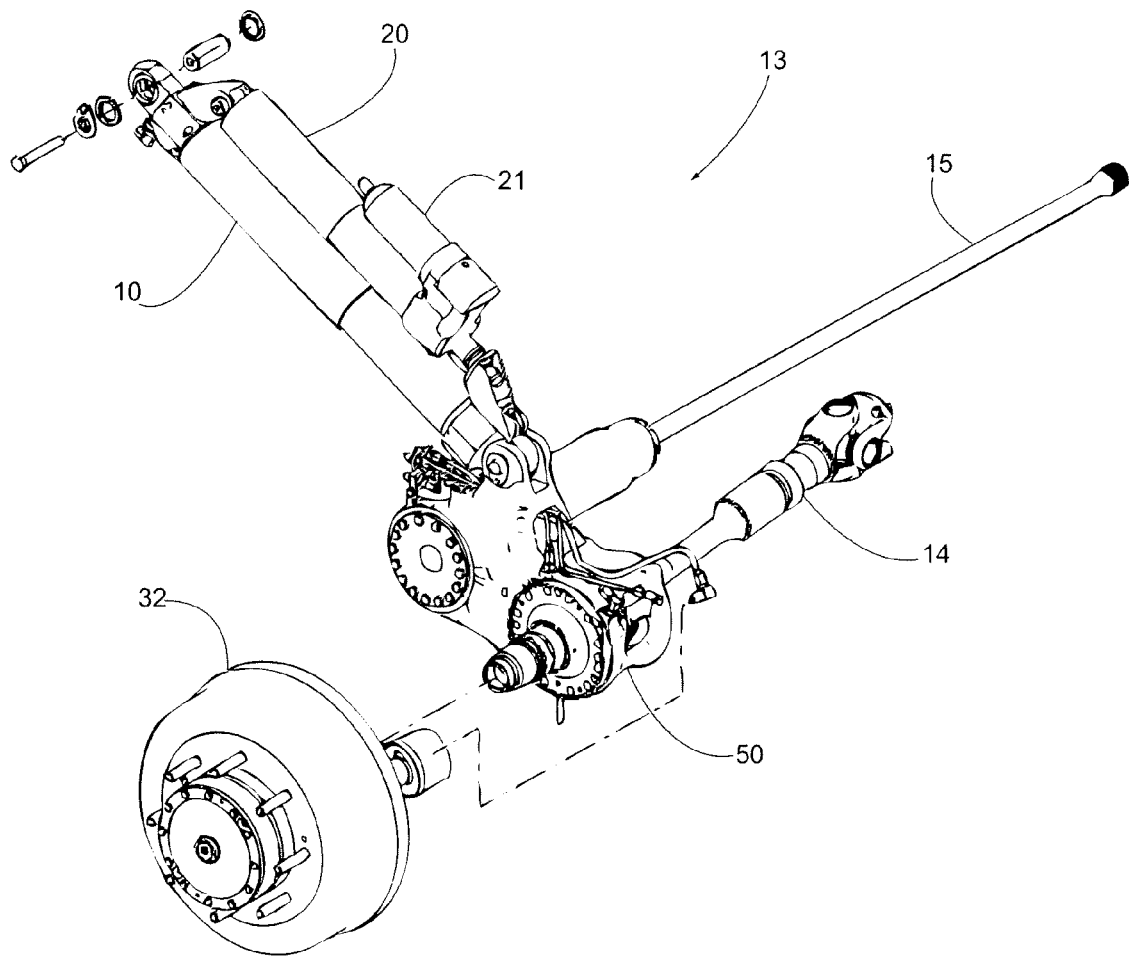
FIG. 3 is a perspective view of a portion of the suspension control system at a non-steering axle.

As depicted in FIGS. 1-3, the mechanical suspension geometry is a parallel spring-damper configuration at the steerable (front) 12 and non-steerable (rear) 13 axle positions. Each axle has a drive shaft 14 connected to a wheel end 32 upon which a wheel 30 is mounted. The suspension at the steerable axles 12 comprises a gas spring 10, a controllable damper 20 and a control arm 40. At the steerable end, the gas spring 10 and damper 20 are coupled to the vehicle hull 5 at different locations. The control arm 40 links the hull 5 with the wheel end 32 and at the same time links the controllable damper 20 with the hull 5. The controllable damper 20 has a reservoir 21 for storing a necessary fluids such as oil and gas thereby allowing an increased duty cycle for the active damper 20 when running at elevated ride heights. The front suspension geometry enables steerable movement of the front wheels 30 at the same time that the hull 5 moves with respect to the wheels 30.

The suspension at the non-steerable axles 13 of the vehicle 2 comprises a gas spring 10, a controllable damper 20, a trailing arm 50 and a stabilizer bar 15. The gas spring 10 and controllable damper 20 may be structurally integrated into a single unit capable of simultaneous movement along the same axis. The parallel spring-damper unit (10, 20) links the trailing arm 50 to the vehicle hull 5. The trailing arm 50 also links the stabilizer bar 15 with the vehicle hull 5. Vehicles with variable payload or a high center of gravity advantageously have adjustable springs 10 or stiffer stabilizer bars 15 to improve vehicle maneuverability and survivability.

The front and rear parallel spring-damper configurations are interconnected with the height management unit 3. In practice, a user can select a preset ride height based on vehicle type, transport mode, or mission profile, and the system delivers a specific amount of gas, such as nitrogen, to each gas spring to establish the preset ride height. Ride height can be preselected or varied as the need arises.

The parallel configuration of the springs 10 and dampers 20 allows the dampers 20 to be removed separately and easily. For example, damaged or defective dampers 20 at the front of the vehicle 2 can be removed without having to jack up the vehicle 2 or remove the wheels 30. Improved maintainability is valuable in a military combat situation where field repair needs to be as quick as possible. The parallel configuration also enables tailored design of gas spring volume and area since the damper is separate from, but parallel to, the spring 10. An independent spring can more easily be designed to have a particular spring rate and to ultimately reduce pressure spikes under extreme load conditions.

Separating the spring 10 from the damper 20 also prevents the spring 10 from heating up in conjunction with the damper 20. Accordingly, the gas inside the spring 10 will not heat up and expand when the damper 20 heats up, thereby preventing unnecessary change of spring 10 variables such as spring rate, compression stroke, extension stroke and ultimately ride height.

The damper response is dependant on the electrical amperage supplied to the electrical circuit in the damper 20. The amount of current supplied to the damper 20 can be instantaneously varied thereby making the damping force smaller or larger as would be appropriate for each individual wheel 30 at a particular instant in time. When no amperage is supplied to the damper 20, such as in a power failure, the damper 20 resorts to passive damping to allow the damper 30 to operate in a fail-safe condition and enable a "limp home" capability. When the amperage is increased from zero, the damper response becomes softer than in the fail-safe condition until a minimum damping response is reached. As the amperage is further increased, the response becomes harder until it reaches a maximum damping force, which is appreciably higher than the fail-safe condition.

One exemplary embodiment of the present invention uses a control arm 40 that is specifically designed to incorporate a parallel front damper 20 with a plurality of possible motion ratios. Various motion ratios may be designed for the dampers, but generally the motion ratio is close to one. The motion ratios are optimized based on packaging constraints of the suspension geometry. The control arm 40 has been designed to accommodate the suspension and steering motions required by vehicles with multiple steerable axles. In particular, the control arm is designed to allow for linear motion of the damper 20 independent of linear motion of the spring 10 and steering knuckle 16. This is achieved by having a stub on the control arm that is fitted with a pivot arm that has the optimal damper mount angle for each specific vehicle hull 5.

Another exemplary embodiment incorporates a front damper mount specifically designed to maximize front damper stroke and with the best possible motion ratio. The damper mount enables quick removal and replacement of the damper 20. This feature not only improves maintainability, but also ensures that the damper 20 becomes a separate consumable, thereby reducing life cycle costs by leaving the more costly gas spring 10 intact.

Figure 4:
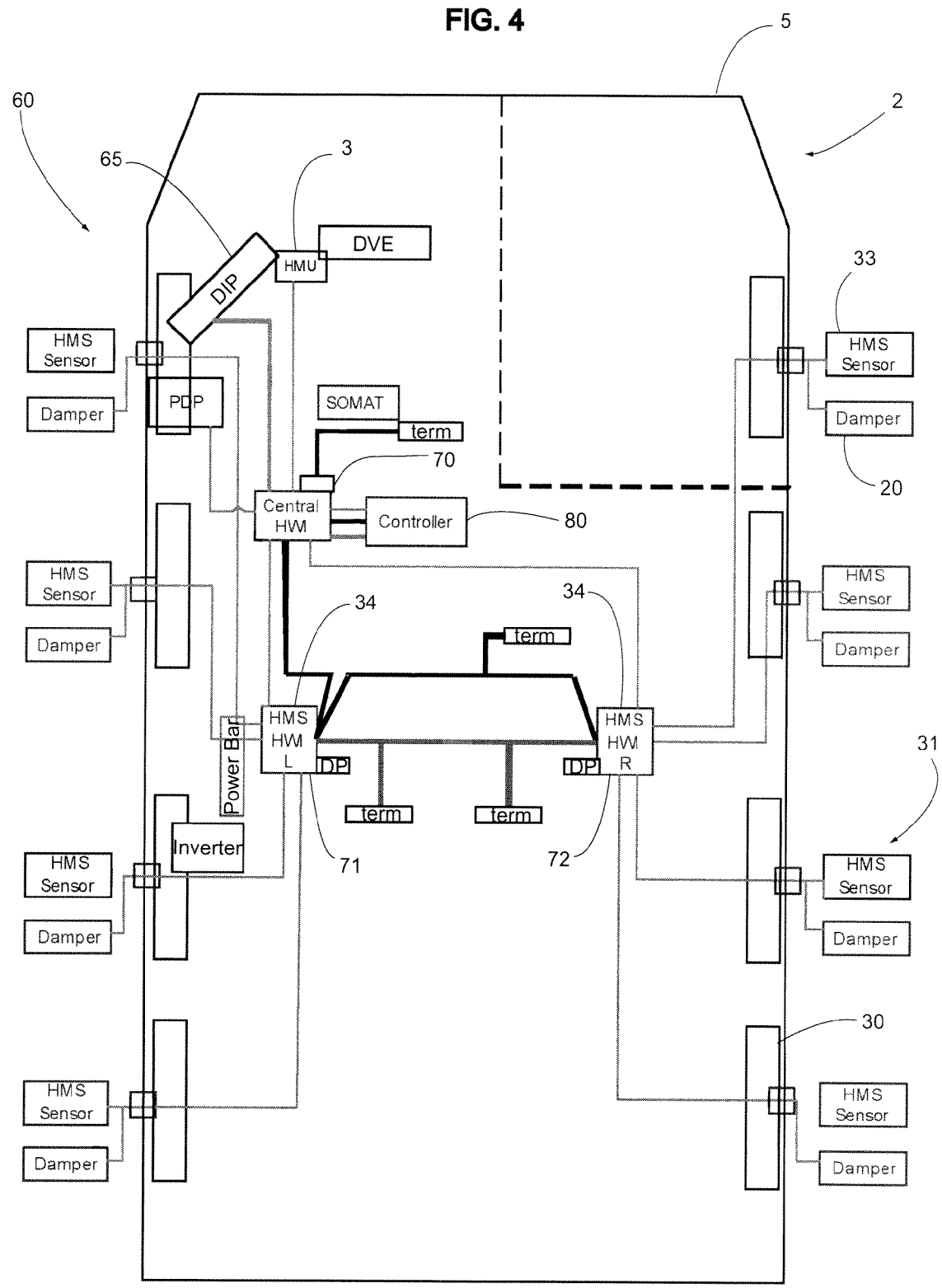
FIG. 4 depicts the electrical architecture of one embodiment of the suspension control system.
Figure 5:
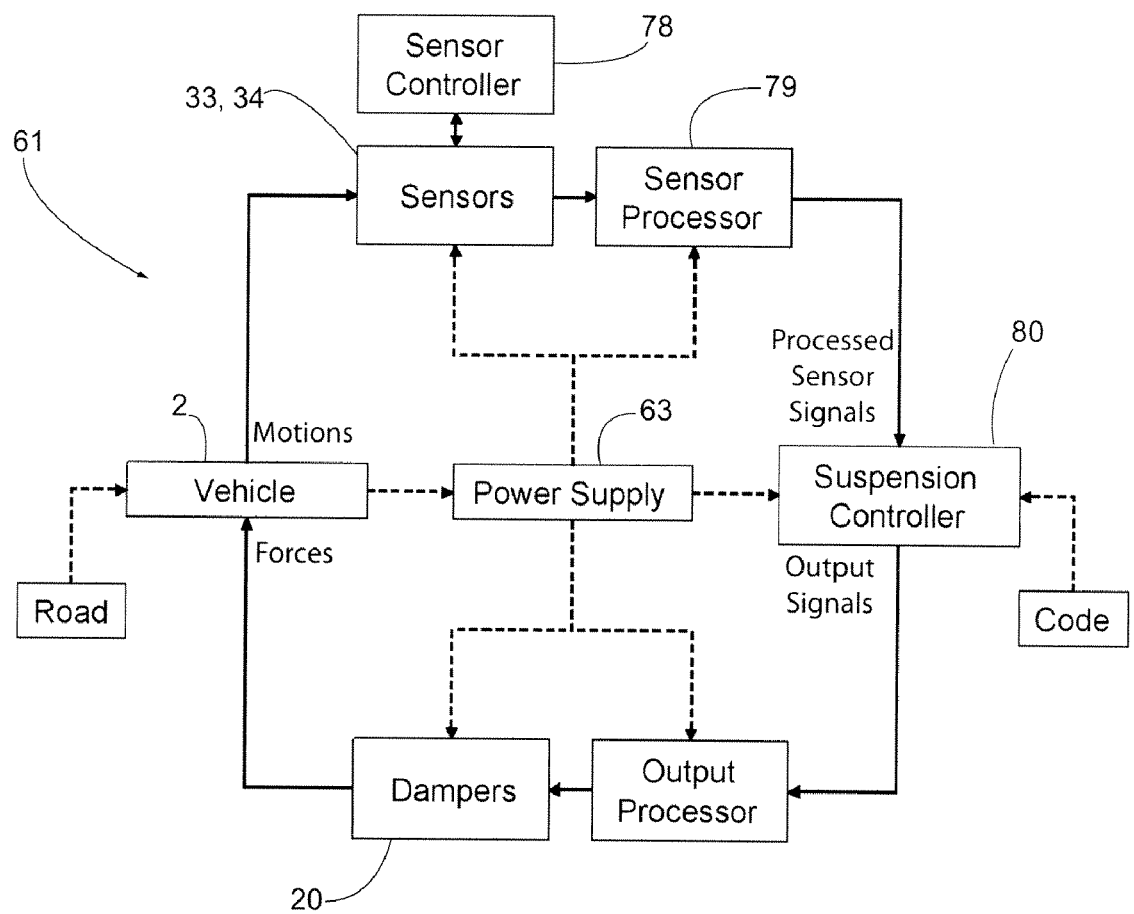
FIG. 5 depicts the control system design of one embodiment of the suspension control system.

FIGS. 3-4 show the electrical architecture 60 and the control system design 61 of the suspension control system 1. The electrical architecture 60 comprises a driver instrument panel 65, a suspension controller 80, a height management unit (HMU) 3, left and right hardware interface boxes (HWI) 71, 72, a central HWI box 70, controllable dampers 20, and height management sensors (HMS). The HMS include wheel sensors 33 and hull sensors 34. The left and right HWI boxes 71, 72 include a sensor controller 78, a sensor processor 79, and hull sensors 34. The central HWI box 70 may be incorporated into the left and right HWI boxes 71, 72 to provide a more compact architecture, and the hull sensors 34 may also be located in the left and right HWI boxes 71, 72. The controllable dampers 20 and wheel sensors 33 are typically provided at each wheel station 31 inside the gas springs. Electrical circuitry interconnects and powers the sensors 33, 34, the suspension controller 80, the HWI boxes 70, 71, 72, and the controllable dampers 20. Damper characteristic response is controlled by the instantaneous current supplied to the damper 20. The suspension controller 80 and the height management unit 3 can also be incorporated into the left and right HWI boxes 71, 72.

The wheel sensors 33 and hull sensors 34 measure the displacement of the wheel 30 and hull 5, respectively. This displacement signals are transmitted to the left and right HWI boxes 71, 72 where they are processed to determine instantaneous displacement, velocity, and acceleration of each wheel and the hull itself. The left and right HWI boxes 71, 72 then convert the velocity signals to Pulse Width Modulated (PWM) currents, which currents are then supplied to the appropriate damper 20. The damper current is typically updated at a rate of at least 200 Hz and the PWM frequency used to drive the damper is typically at least 1000 Hz. The suspension controller 80 can continuously update the damping control strategy based on the sensor input. To execute the damping control strategy, the suspension controller 80 transmits signals to the left and right HWI boxes 71, 72, which in turn supplies current (or "demanded current") to each damper 20.

Electrical power for the suspension control system 1 is supplied from a vehicle power distribution panel or a power control module (PCM) 63. A harness supplies bus power from the PCM 63 to the central HWI box 70. The central HWI 70 circuitry distributes vehicle bus power to the left and right HWI boxes 71, 72 and the suspension controller 80. The central HWI box 70 is linked by a harness to the height management unit (HMU) 3. The HMU 3 is a controller that enables a user to set the vehicle ride height via the driver instrument panel 65. The HMU 3 is electrically integrated with a hydraulic system that enables the addition or removal of gas to the gas springs 10 at each wheel 30. The left and right HWI boxes 71, 72 are capable of sending the required signals to the HMU 3 and ensure that the wheel and hull sensors 33, 34 remain powered even if signals are no longer required by the HMU 3.

Individual wheel displacements are sensed simultaneously at each wheel station 31 by the wheel sensors 33. The front and rear wheel sensors 33 may be located in the front and rear springs 10, respectively, and are calibrated for height changes based on displacement of each spring 10. The HMU 3 optimally operates when wheel sensors 33 are installed on at least four of the wheel stations 31. For multi-axle vehicles, wheel displacement sensing is best achieved by installing wheel sensors 33 at each wheel station 31. Analog wheel displacement signals for the left and right side of the vehicle may be continuously supplied to the left and right HWI boxes 71, 72, respectively.

The left and right HWI boxes 71, 72 contain sensing, control and networking capabilities. The hull sensors 34 typically comprise six degrees-of-freedom (6-DOF) sensors that generate signals characteristic of vehicle hull motions in the principal roll, pitch and yaw angular directions as well as acceleration in the principal longitudinal, lateral and vertical directions. The vehicle hull motion information is compiled from the hull sensors 34 by an integrated controller card in the left and right HWI boxes 71, 72. The left and right HWI boxes

71, 72 are interconnected by at least two controller area networks (CAN). The first network is dedicated to the transmission of signal data, dynamic parameter data, fault data, and self healing commands, to and from the suspension controller. The first network is also used to communicate hull motion signal data to the suspension controller 80 and relaying the controller output signal data (containing the current demand for each damper 20) to the left and right HWI boxes 71, 72. The second network is used to communicate digital information from the suspension controller 80 to the driver instrument panel 65 and allows the driver to select and communicate preconditioned settings based on mission demands, road conditions and the environment, as discussed above. The second network also communicates built-in test data to the driver's instrument panel 65. The damper current demand may be continuously updated by the suspension controller 80 and relayed digitally to the left and right HWI boxes 71, 72. Under normal conditions each of the left and right HWI boxes 71, 72 is dedicated to control one half of the controllable dampers 20. The duty cycle of the damper currents are controlled based on current feedback to ensure that damping force remains stable despite damper temperature fluctuations, changes in individual component characteristics or changing environmental conditions.

The central HWI box 70 acts as a distribution point for analog voltage signals and the digital CAN signals. It is passively connected to the suspension controller 80 with the two CAN networks discussed above. The three HWI boxes 70, 71, 72 may be supplied with diagnostic connectors that support the acquisition of signal and control data for the purpose of system evaluation and fault finding.

Using the vehicle hull 5 as the frame of reference, the displacement of the wheel 30 is considered relative motion and sensing the relative displacement of the wheel 30 is easily achieved. The vehicle hull 5 is considered to move in the global frame of reference and therefore hull motions are referred to as absolute motion. Hull motions are more difficult to measure but can be sensed in the orthogonal directions with the hull sensors 34, which may be six degrees-of-freedom sensors or solid state gyroscopes placed in the left and right HWI boxes 71, 72. The zero-point in the global frame of reference can be considered the vehicle datum coordinates at nominal, level ride height with known tire pressures and vehicle payload. Absolute (hull) and relative (wheel) displacement of the vehicle are both measured to optimally control the vehicle suspension.

As the wheel and hull sensors 33, 34 gather relative and absolute vehicle motion data, the signals are typically supplied to the suspension controller 80 in digital form. The relative motion signal may be in the form of an analog voltage directly proportional to the relative displacement of the wheel 30. These voltages may be continuously sensed for each wheel 30. Hull motion is considered absolute motion and is sensed by the hull sensors 34. The absolute motion signal gathered by the hull sensors 34 may be communicated to the suspension controller 80 in digital form. The relative and absolute displacements are typically sensed at frequencies of at least 200 Hz. The suspension controller 80 processes the incoming and converted digital signals to determine the relative (wheel) and absolute (hull) velocities in the wheel station frame of reference. These wheel and hull velocities are utilized to determine the optimal damping control strategy. The damping control strategy is based on mathematical constructs known as Skyhook and Groundhook control. Hull and wheel displacement data are used as input variables to control the switching, blending, modifying or abandoning of sub-strategies. Damping control strategies or sub-strategies include formulations to (1) improve ride quality on rough cross-country terrain, (2) improve handling capability, (3) reduce shock loads, (4) improve passenger comfort, (5) increase safe vehicle response to steering input, (6) reduce propensity for rollover, and (7) reduce the load profile for critical subsystems. The damping control strategy and parameterization of software settings are optimized through operational testing of the whole vehicle system prior to vehicle production. The damping control strategy also takes into account suspension geometry, spring rates, stabilizer bar stiffness and damping window range (a range of damping responses or force values for any velocity that the damper is subjected to). The damping control strategy is optimized during operation of the vehicle by comparing the resulting actual wheel 30 and hull 5 motions to expected motions such that the effectiveness of the damping control strategy is continually improved at varying ride heights. In this manner, it is possible to ride the vehicle 2 low or high without any further manual adjustments to the suspension system. Enhanced survivability is achieved since the vehicle 2 maneuvers and rides approximately as well in a high ride position as in the nominal position. This is a significant advantage over conventional suspension systems, and the inventor has surprisingly found that a vehicle equipped with the semi-active suspension control system 1 disclosed herein can handle even better when riding high on hard surfaces due to the effect of stiffer springs (more gas volume) and the automatic and immediately hard damping that can be employed by the suspension control system 1.

The overall damping control strategy typically utilizes simultaneous digital output commands for each controllable damper 20 installed on the vehicle 2. The output commands are generally updated at a frequency of at least 200 Hz, but other frequencies may be used. Each output command is converted by a damper control circuit (located in the left and right HWI 71, 72 or in the damper 20 itself) to a damper current, and this damper current is mapped for the duty cycle required to electronically drive a PWM circuit. The PWM circuit for each damper 20 pulses the output supply voltage resulting in the appropriate current for the required damping force response. The damper control circuit utilizes current feedback correction in order to ensure the correct response independent of coil temperature or individual component variations.

The response of the damper 20 is based on the electrical current flowing to the damper 20 as well as the relative velocity experienced by the damper 20 when actuated by wheel displacement. The damping force exerted at each wheel station 31 can be continuously varied depending on the damping control strategy demanded for the vehicle 2 at that instant in time. The resultant force manipulation at each wheel station 31 has an effect on the relative motion of the wheels 30 as well as a subsequent effect on the absolute motion of the hull 5. These subsequent motions are continually sensed and controlled with the damping control strategies that are appropriate at any instant in time.

The suspension control system 1 disclosed herein allows for improved ride and handling characteristics of a vehicle that traverses various terrain. The design of the suspension control system 1 is capable of optimizing interactions between damping at each wheel 30, spring oscillations at each wheel 30, variable vehicle payloads, tire inflation pressures, vehicle centers of gravity, vehicle ride heights, and variable terrains.

From the foregoing, it is apparent that the suspension control system described above not only provides for the reliable accomplishment of the various objects of the invention, but does so in a particularly effective and reliable manner. It is recognized, of course, that those skilled in the art may make various modifications or additions to the exemplary embodiments disclosed herein to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A semi-active suspension control system for stabilizing a vehicle comprising:
    a spring element positioned between a portion of a hull and a drive shaft of the vehicle;
    a controllable damper element positioned adjacent to the spring element;
    a wheel sensor positioned at each wheel station on the vehicle for measuring displacement of each wheel of the vehicle;
    a hull sensor positioned on the hull of the vehicle for sensing displacement of the hull; and
    a suspension controller for delivering a variable output signal to the controllable damper element, the variable output signal being based on displacement data acquired by the wheel and hull sensors, and effectuating a damping response of the controllable damper,
    wherein the suspension controller determines a damping strategy and is adapted to optimize the damping strategy during operation of the vehicle, the damping strategy being a function of vehicle payload and vehicle ride height.

2. The semi-active suspension control system of claim 1, further comprising a height management unit for setting a ride height of the vehicle.

3. The semi-active suspension control system of claim 2, wherein the spring element is a gas spring and the height management unit sets the ride height of the vehicle by adjusting an amount of gas in the gas spring.

4. The semi-active suspension control system of claim 2, further comprising at least one hardware interface box that processes the acquired displacement data to calculate a wheel velocity and a hull velocity over a finite period of time.

5. The semi-active suspension control system of claim 4, wherein the suspension controller uses the wheel and hull velocities to determine the damping strategy.

6. The semi-active suspension control system of claim 4, wherein the variable output signal is delivered to the damper element from the suspension controller and the at least one hardware interface box.

7. The semi-active suspension control system of claim 1, wherein the spring element and the damper element are separate from each other and are oriented substantially parallel to each other.

8. The semi-active suspension control system of claim 1, wherein the spring element and the damper element are coupled to the vehicle hull at different locations at a front portion of the vehicle, and coupled to the vehicle hull at the same location at a rear portion of the vehicle.

9. The semi-active suspension control system of claim 1, wherein the variable output signal is in the form of a variable current.

10. The semi-active suspension control system of claim 9, wherein the damper element functions as a passive damper element having a predetermined damping response when the variable current delivered to the damper element is substantially zero.

11. The semi-active suspension control system of claim 1, wherein the damping strategy is optimized during operation of the vehicle by a comparison of the displacement data acquired by the wheel and hull sensors with expected wheel and hull displacement data.

12. A semi-active suspension control system for stabilizing a multi-axle vehicle comprising:
    a plurality of wheels;
    a spring element positioned near each wheel of the multi-axle vehicle;
    a controllable damper element positioned adjacent to each spring element;
    a plurality of wheel sensors for sensing displacement of the wheels, each wheel of the multi-axle vehicle having at least one of the plurality of wheel sensors positioned adjacent thereto;
    at least one hull sensor positioned on a hull of the vehicle for sensing displacement of the hull; and
    a suspension controller and at least one hardware interface box for delivering a unique variable output signal to each controllable damper element,
    the unique variable output signals being based on displacement data acquired by the plurality of wheel sensors and the at least one hull sensor, each of the variable output signals effectuating a damping response of one of the controllable damper elements, and
    wherein the suspension controller determines a damping strategy and is adapted to optimize the damping strategy during operation of the vehicle, the damping strategy being a function of vehicle payload and vehicle ride height.

13. The semi-active suspension control system of claim 12, further comprising a height management unit for setting a ride height of the vehicle.

14. The semi-active suspension control system of claim 13, wherein the spring element is a gas spring and the height management unit sets the ride height of the vehicle by adjusting an amount of gas in the gas spring.

15. The semi-active suspension control system of claim 13, wherein the at least one hardware interface box processes the acquired displacement data to calculate a wheel velocity and a hull velocity over a finite period of time.

16. The semi-active suspension control system of claim 15, wherein the suspension controller uses the wheel and hull velocities as an input to determine the damping strategy.

17. The semi-active suspension control system of claim 12, wherein the variable output signals are delivered to the controllable damper elements from the suspension controller and the at least one hardware interface box.

18. The semi-active suspension control system of claim 12, wherein the spring elements and the damper elements are separate from each other and are oriented substantially parallel to each other.

19. The semi-active suspension control system of claim 12, wherein the spring elements and the damper elements are coupled to the vehicle hull at different locations at a front portion of the vehicle, and coupled to the vehicle hull at the same location at a rear portion of the vehicle.

20. The semi-active suspension control system of claim 12, wherein the variable output signals are in the form of variable currents.

21. The semi-active suspension control system of claim 20, wherein the damper elements function as passive damper elements with a predetermined damping response when the variable currents delivered to the damper elements are substantially zero.

* * * * *

UNITED STATES PATENT AND TRADEMARK OFFICE
CERTIFICATE OF CORRECTION

PATENT NO. : 8,376,373 B2
APPLICATION NO. : 12/951562
DATED : February 19, 2013
INVENTOR(S) : Daniel Francois Conradie It is certified that error appears in the above-identified patent and that said Letters Patent is hereby corrected as shown below:

On the title page, (73) Assignee should read: General Dynamics Land Systems - Canada Corporation
Ontario (CA)

Signed and Sealed this
Eighteenth Day of June, 2013

Teresa Stanek Rea
*Acting Director of the United States Patent and Trademark Office*